US012027778B2

(12) United States Patent
Yu

(10) Patent No.: US 12,027,778 B2
(45) Date of Patent: Jul. 2, 2024

(54) LIQUID CRYSTAL ANTENNA UNIT, LIQUID CRYSTAL PHASED ARRAY ANTENNA AND PHASE CALIBRATION METHOD

(71) Applicant: BOE TECHNOLOGY GROUP CO., LTD., Beijing (CN)

(72) Inventor: Hai Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 763 days.

(21) Appl. No.: 17/265,553

(22) PCT Filed: Jun. 2, 2020

(86) PCT No.: PCT/CN2020/093906

§ 371 (c)(1),
(2) Date: Feb. 3, 2021

(87) PCT Pub. No.: WO2020/244499

PCT Pub. Date: Dec. 10, 2020

(65) Prior Publication Data

US 2021/0296772 A1 Sep. 23, 2021

(30) Foreign Application Priority Data

Jun. 3, 2019 (CN) ......................... 201910477210.2

(51) Int. Cl.
*H01Q 3/26* (2006.01)
*H01Q 3/36* (2006.01)
*H01Q 21/06* (2006.01)

(52) U.S. Cl.
CPC ............... *H01Q 3/267* (2013.01); *H01Q 3/36* (2013.01); *H01Q 21/065* (2013.01)

(58) Field of Classification Search
CPC ........... H01Q 3/267; H01Q 3/36; H01Q 3/44; H01Q 21/065
See application file for complete search history.

(56) References Cited

U.S. PATENT DOCUMENTS

2018/0294557 A1* 10/2018 Lu ........................ H01Q 19/067

FOREIGN PATENT DOCUMENTS

| | | | |
|---|---|---|---|
| CN | 101938305 | A | 1/2011 |
| CN | 104409860 | A | 3/2015 |
| CN | 106299627 | A | 1/2017 |
| CN | 107064887 | A | 8/2017 |
| CN | 108232383 | A | 6/2018 |

(Continued)

OTHER PUBLICATIONS

China Patent Office, First Office Action dated Aug. 5, 2020, for corresponding Chinese application 201910477210.2.

*Primary Examiner* — Robert Karacsony

(74) *Attorney, Agent, or Firm* — HOUTTEMAN LAW LLC

(57) ABSTRACT

The present disclosure provides a liquid crystal antenna unit, including: a first substrate; a second substrate disposed opposite to the first substrate; a liquid crystal layer disposed between the first substrate and the second substrate; an antenna unit disposed on a side of the first substrate facing away from the liquid crystal layer; and an antenna control unit disposed corresponding to the antenna unit and configured to control ON/OFF of the antenna unit. The present disclosure further provides a liquid crystal phased array antenna and a phase calibration method.

13 Claims, 3 Drawing Sheets

(56) References Cited

FOREIGN PATENT DOCUMENTS

| | | | |
|---|---|---|---|
| CN | 208723092 | U | 4/2019 |
| CN | 110176673 | A | 8/2019 |
| DE | 4025766 | A | 2/1991 |
| JP | 2017106984 | A | 6/2017 |

* cited by examiner

LIQUID CRYSTAL ANTENNA UNIT, LIQUID CRYSTAL PHASED ARRAY ANTENNA AND PHASE CALIBRATION METHOD

CROSS-REFERENCE TO RELATED APPLICATION

The present application claims priority to Chinese Patent Application 201910477210.2 filed with the China National Intellectual Property Administration on Jun. 3, 2019, the disclosure of which is incorporated herein by reference in its entirety.

TECHNICAL FIELD

Embodiments of the disclosure relate to the technical field of antennas, and in particular relate to a liquid crystal antenna unit, a liquid crystal phased array antenna and a phase calibration method.

BACKGROUND

Current phased array antennas, more flexible and reliable in scanning compared with traditional mechanical scanning antennas, have been widely applied to the military field, and are actively promoted to the civil market. A liquid crystal phased array antenna usually adopts a liquid crystal phase shifter to realize a phase shift of the antenna unit. Since it is hard to obtain consistent liquid crystal phase shifters in the preparation process, initial phases of the antenna units in the liquid crystal phased array antenna may differ from each other, resulting in antenna beams that cannot perform scanning in the expected direction.

In the related art, it is a common method to calibrate the initial phase of each antenna unit by a vector network analyzer. During the phase calibration process of each antenna unit in the liquid crystal phased array antenna by the vector network analyzer, RF signals of the individual antenna units in the liquid crystal phased array antenna are coupled in a spatial field and each antenna unit is in a path state, so that during the phase calibration test on a certain antenna unit, the coupled signals of adjacent antenna units will greatly affect the tested phase of the antenna unit to be tested. That is, RF signals transmitted from the vector network analyzer, which should be received by the antenna unit to be tested, are actually received by the antenna unit to be tested as well as surrounding antenna units thereof on the front of the liquid crystal phased array antenna due to the inherent characteristic of spatial coupling of the RF signals. The RF signals are then synthesized by a feed network, and transmitted back to a receiving port of the vector network analyzer. Thus, the resulted phase from the test is actually a synthesized phase of multiple antenna units. Thereby, the resulted test errors can reduce the initial phase consistency of the individual antenna units in the product, and impair radiation performance of the liquid crystal phased array antenna.

SUMMARY

To solve at least one of the above problems in the related art, embodiments of the present disclosure provide a liquid crystal antenna unit, a liquid crystal phased array antenna and a phase calibration method.

In a first aspect, an embodiment of the present disclosure provides a liquid crystal antenna unit, including:

- a first substrate;
- a second substrate disposed opposite to the first substrate;
- a liquid crystal layer disposed between the first substrate and the second substrate;
- an antenna unit disposed on a side of the first substrate facing away from the liquid crystal layer; and
- an antenna control unit disposed corresponding to the antenna unit and configured to control ON/OFF of the antenna unit.

In some embodiments, the liquid crystal antenna unit further includes a third substrate; wherein

- the third substrate is disposed on the side of the first substrate facing away from the liquid crystal layer; and
- the antenna unit is disposed on the third substrate.

In some embodiments, the antenna unit is disposed on a side of the third substrate facing away from the liquid crystal layer, and the antenna control unit is disposed on a side of the third substrate facing toward the liquid crystal layer.

In some embodiments, the antenna unit is disposed on a side of the third substrate facing toward the liquid crystal layer, and the antenna control unit is disposed on a side of the third substrate facing away from the liquid crystal layer.

In some embodiments, the antenna unit and the antenna control unit are both disposed on a side of the third substrate facing away from the liquid crystal layer; or the antenna unit and the antenna control unit are both disposed on a side of the third substrate facing toward the liquid crystal layer.

In some embodiments, the first substrate, the second substrate, and the third substrate are each made of glass.

In some embodiments, the antenna control unit includes an RF switch. In some embodiments, the RF switch is an RF MEMS switch including: a vibration film layer, two insulation layers at two ends of the vibration film layer, and two RF signal transmission lines disposed corresponding to the two insulation layers one by one and positioned in the same plane, wherein each of the insulation layers is clamped between the vibration film layer and one of the RF signal transmission lines, and

- when a control voltage is applied to the RF MEMS switch, the vibration film layer of the RF MEMS switch is deformed to a position between the two RF signal transmission lines so that the RF MEMS switch is turned on.

In some embodiments, the liquid crystal antenna unit further includes a transmission line located between the first substrate and the liquid crystal layer or between the second substrate and the liquid crystal layer.

In a second aspect, an embodiment of the present disclosure provides a liquid crystal phased array antenna, including a plurality of liquid crystal antenna units according to any one of the embodiments described above arranged in an array.

In some embodiments, the first substrates of the plurality of liquid crystal antenna units belong to the same substrate, and the second substrates of the plurality of liquid crystal antenna units belong to the same substrate.

In some embodiments, the third substrates of the plurality of liquid crystal antenna units belong to the same substrate.

In some embodiments, the transmission lines of the plurality of liquid crystal antenna units belong to the same transmission line.

In a third aspect, an embodiment of the present disclosure provides a phase calibration method of a liquid crystal phased array antenna, the liquid crystal phased array antenna being the liquid crystal phased array antenna according to any one of the embodiments described above, and the phase calibration method including:

sequentially taking each of the antenna units in the liquid crystal phased array antenna as an antenna unit to be calibrated, and executing the following steps:

controlling the antenna unit to be calibrated to be ON by the corresponding antenna control unit thereof;

controlling the rest antenna units to be OFF by the corresponding antenna control units thereof, respectively, wherein the rest antenna units include all the antenna units except the antenna unit to be calibrated;

testing a phase of an RF signal radiated from the antenna unit to be calibrated by a phase testing device; and executing the following steps after the phase of the RF signal radiated from each of the antenna units is tested:

carrying out phase calibration on each of the antenna units by a phase shifter, wherein the phase shifter includes the first substrate, the liquid crystal layer and the second substrate.

DETAILED DESCRIPTION OF THE EMBODIMENTS

To improve understanding of the technical solution of the present disclosure for those skilled in the art, the liquid crystal antenna unit, the liquid crystal phased array antenna, and the phase calibration method provided in the disclosure will be described below in detail in conjunction with the accompanying drawings.

Figure 1:
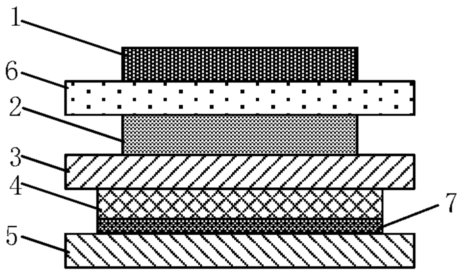
FIG. 1 is a schematic structural diagram of a liquid crystal antenna unit according to an embodiment of the present disclosure.

FIG. 1 is a schematic structural diagram of a liquid crystal antenna unit according to an embodiment of the present disclosure. As shown in FIG. 1, the liquid crystal antenna unit includes an antenna unit 1, an antenna control unit 2, a first substrate 3, a liquid crystal layer 4, and a second substrate 5 disposed opposite to the first substrate 3.

The liquid crystal layer 4 is disposed between the first substrate 3 and the second substrate 5. The antenna unit 1 is disposed on a side of the first substrate 3 facing away from the liquid crystal layer 4, or the antenna unit 1 is disposed on a side of the second substrate 5 facing away from the liquid crystal layer 4. The antenna control unit 2 is disposed corresponding to the antenna unit 1, and is configured to control ON/OFF of the antenna unit 1. The corresponding arrangement here may be interpreted as that each of the antenna units is provided with a corresponding antenna control unit, but the position of the antenna control unit relative to the antenna units is not limited here.

In an embodiment of the present disclosure, the antenna unit 1 is configured to receive/transmit RF signals (e.g., electromagnetic waves). Specifically, when the antenna unit 1 is turned ON, the antenna unit 1 can be operated normally, and can receive and transmit RF signals. When the antenna unit 1 is turned OFF, the antenna unit 1 is unable to be operated and cannot receive or transmit RF signals. In other words, controlling the antenna unit 1 to be ON may be interpreted as switching on (opening) a channel for controlling the antenna unit 1 to radiate/receive RF signals, and controlling the antenna unit 1 to be OFF may be interpreted as cutting off (closing) a channel for controlling the antenna unit 1 to radiate/receive RF signals.

The liquid crystal antenna unit provided in the embodiment of the disclosure is applied to a liquid crystal phased array antenna which may include a plurality of liquid crystal antenna units arranged in an array. Since each antenna unit 1 is provided with a corresponding antenna control unit 2 for controlling ON/OFF of the antenna unit 1, when any one of the antenna units 1 in the liquid crystal phased array antenna is subjected to phase calibration, the antenna unit 1 may be controlled to be ON by the corresponding antenna control unit 2 thereof, while the rest antenna units are controlled to be OFF by the corresponding antenna control units thereof, respectively. That is, when any one of the antenna units in the liquid crystal phased array antenna is subjected to phase calibration, only the channel for receiving RF signals of that antenna unit is opened, while the channels for receiving RF signals of all the rest antenna units are closed. Thereby, the influence on the tested phase of the antenna unit to be tested due to a coupling effect in a spatial electromagnetic field of adjacent antenna units of the antenna unit to be tested is effectively avoided, and calibration measurement of the initial phase of the antenna unit to be tested is accurately realized, which significantly reduces calibration errors, greatly improves accuracy of the phase calibration test for the liquid crystal phased array antenna, radiation performance of the liquid crystal phased array antenna, and thus efficiency of the phase calibration test for the liquid crystal phased array antenna, and shortens the phase calibration test process for the liquid crystal phased array antenna, thereby substantially simplifying the volume production test for the liquid crystal phased array antenna, and reducing the test cost before products leave the factory.

In some embodiments, as shown in FIG. 1, the liquid crystal antenna unit further includes a third substrate 6 disposed on a side of the first substrate 3 facing away from the liquid crystal layer 4. In some embodiments, the third substrate 6 is disposed on a side of the second substrate 5 facing away from the liquid crystal layer 4. It should be noted that FIG. 1 merely shows the case where the third substrate 6 is disposed on a side of the first substrate 3 facing away from the liquid crystal layer 4.

In some embodiments, the first substrate 3 and the second substrate 5 are each further provided with a metal pattern, while the antenna unit 1 is expected to radiate/receive electromagnetic waves into/from a space. Due to a shielding effect of the metal pattern on the electromagnetic waves radiated/received from/by the antenna unit 1, normal operation of the antenna unit 1 may be affected. Thus, in some embodiments, as shown in FIG. 1, the antenna unit 1 is disposed on the third substrate 6. In this manner, interference of the metal patterns on the first substrate 3 and the second substrate 5 with the radiation/reception of electromagnetic waves by the antenna unit 1 is prevented. In some embodiments, the antenna control unit 2 provided corresponding to the antenna unit 1 is disposed on the third substrate 6, too.

In some embodiments, as shown in FIG. 1, the antenna unit 1 is disposed on a side of the third substrate 6 facing away from the liquid crystal layer 4, and the antenna control unit 2 is disposed on a side of the third substrate 6 facing toward the liquid crystal layer 4. In this case, the antenna unit 1 and the antenna control unit 2 are disposed on two sides of the third substrate 6, respectively, and both take the third substrate 6 as a mounting base. Such a structure is relatively stable and easy to assemble. In some embodiments, the antenna unit 1 is disposed on a side of the third substrate 6 facing toward the liquid crystal layer 4, and the antenna control unit 2 is disposed on a side of the third substrate 6 facing away from the liquid crystal layer 4. Similar to the above arrangement, the antenna unit 1 and the antenna control unit 2 are disposed on two sides of the third substrate 6, respectively, and both take the third substrate 6 as a mounting base. Such a structure is relatively stable and easy to assemble. In some embodiments, the antenna unit 1 and the antenna control unit 2 may be both disposed on the side of the third substrate 6 facing away from the liquid crystal layer 4, or the antenna unit 1 and the antenna control unit 2 may be both disposed on the side of the third substrate 6 facing toward the liquid crystal layer 4.

In some embodiments, the antenna control unit 2 includes an RF switch. In some embodiments, the RF switch is an RF MEMS switch. The term "MEMS" is an abbreviation for "Micro-Electro-Mechanical System".

Figure 2:
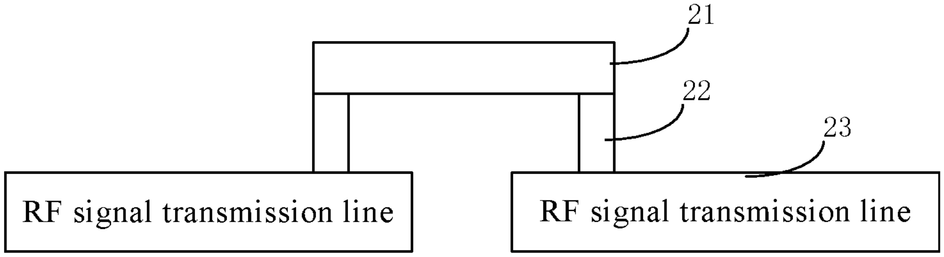
FIG. 2 is a schematic structural diagram of an RF MEMS switch.

FIG. 2 is a schematic structural diagram of an RF MEMS switch. As shown in FIG. 2, the RF MEMS switch includes: a vibration film layer 21, insulation layers 22 and RF signal transmission lines 23. There are two insulation layers 22 located on a left side and a right side of the vibration film layer 21, respectively. There are two RF signal transmission lines 23 disposed corresponding to the two insulation layers 22 one by one and positioned in the same plane. Each of the two insulation layers 22 is clamped between the vibration film layer 21 and one of the RF signal transmission lines 23, and the two RF signal transmission lines 23 are positioned in the same plane. In practical applications, the RF signal transmission line 23 on the left side in FIG. 2 is coupled to the RF signal transmission line in the antenna unit 1, and the RF signal transmission line 23 on the right side in FIG. 2 is coupled to an RF signal transmission line of a device (e.g., a vector network analyzer) for performing a phase calibration test on the antenna unit 1.

Figure 3:
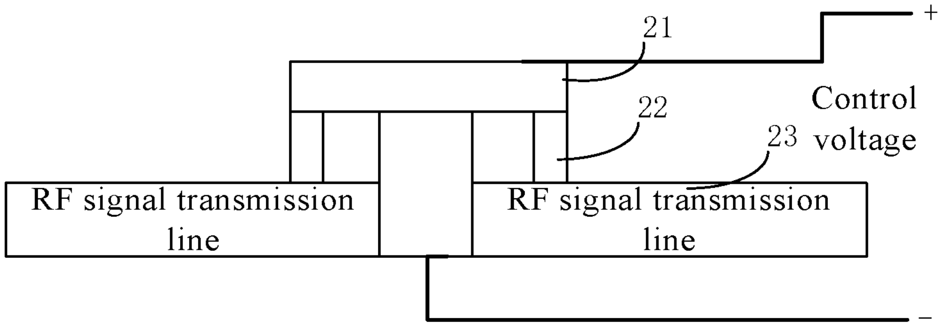
FIG. 3 is a schematic diagram showing an RF MEMS switch in an "ON" state.

An RF MEMS switch typically has an ON state and an OFF state. FIG. 2 shows the OFF state of the RF MEMS switch in which the RF signal transmission line 23 on the left side is disconnected from the RF signal transmission line 23 on the right side. FIG. 3 is a schematic diagram of the RF MEMS switch in the ON state in which the RF signal transmission line 23 on the left side is connected to the RF signal transmission line 23 on the right side.

The principle of controlling ON/OFF of the antenna unit 1 will be further described with reference to FIGS. 2 and 3 by taking an RF MEMS switch as an example.

Taking an RF MEMS switch as an example, the antenna unit is controlled to be ON or OFF by controlling ON/OFF of the RF MEMS switch.

Specifically, as shown in FIG. 3, when a control voltage is applied onto the RF MEMS switch, the RF MEMS switch is in an ON state in which the vibration film layer 21 of the RF MEMS switch is deformed and pulled down to a position between the RF signal transmission line 23 on the left side and the RF signal transmission line 23 on the right side, so that the RF signal transmission line 23 on the left side is connected to the RF signal transmission line 23 on the right side. At this time, the antenna unit 1 is ON, and the antenna unit 1 can receive and transmit RF signals.

As shown in FIG. 2, when the control voltage on the RF MEMS switch is removed, the RF MEMS switch is in an OFF state in which the RF signal transmission line 23 on the left side is disconnected from the RF signal transmission line 23 on the right side. At this time, the antenna unit 1 is OFF, and the antenna unit 1 cannot receive and transmit RF signals.

In practical applications, the ON/OFF state of the RF signal transmission of each antenna unit 1 in the liquid crystal phased array antenna can be realized by controlling the ON/OFF state of the RF MEMS switch corresponding to the antenna unit 1. Therefore, by controlling only the antenna unit 1 to be tested to be ON and all the rest antenna units 1 to be OFF, the influence on the tested phase of the antenna unit 1 to be tested due to the coupling effect in a spatial electromagnetic field of other antenna units is effectively avoided.

In some embodiments, as shown in FIG. 1, the liquid crystal antenna unit further includes a transmission line 7 located between the second substrate 5 and the liquid crystal layer 4. In some embodiments, the transmission line 7 is located between the first substrate 3 and the liquid crystal layer 4. In practical applications, in a transmission scenario, the transmission line 7 is configured to feed electromagnetic wave signals from a transmitter (not shown in the figures) to the antenna unit 1; and in a receiving scenario, the transmission line 7 is configured to transmit electromagnetic wave signals from the antenna unit 3 to a receiver (not shown in the figures).

In an embodiment of the present disclosure, the liquid crystal antenna unit includes a liquid crystal phase shifter, wherein the liquid crystal phase shifter includes the first substrate 3, the liquid crystal layer 4 and the second substrate 5 as described above. In an embodiment of the present disclosure, the liquid crystal phase shifter further includes other structures. As a known technology, the liquid crystal phase shifter is not detailed here.

In an embodiment of the present disclosure, the antenna unit 1 may include a radiation unit configured to transmit RF signals, and a receiving unit configured to receive RF signals. In an embodiment of the present disclosure, the antenna unit 1 is also referred to as an array element.

In an embodiment of the present disclosure, the first substrate 3, the second substrate 5, and the third substrate 6 may be each made of glass. The first substrate 3, the second substrate 5, and the third substrate 6 made of glass may facilitate more efficient and convenient provision of the RF MEMS switch. In some embodiments, the first substrate 3, the second substrate 5, and the third substrate 6 may be made of other suitable substrate materials, which are not listed here.

Figure 4:
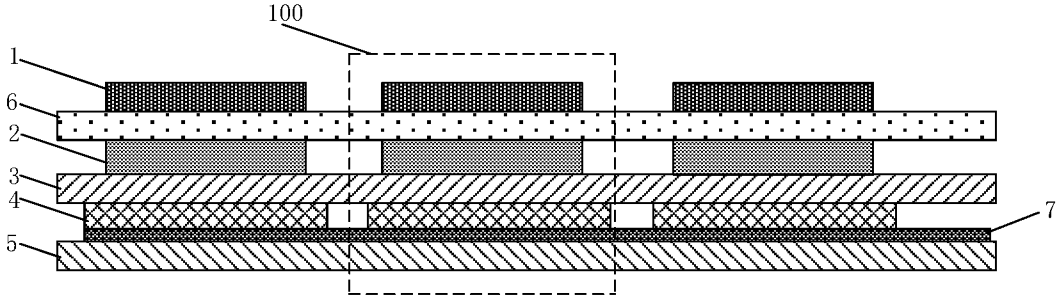
FIG. 4 is a schematic structural diagram of a liquid crystal phased array antenna according to an embodiment of the present disclosure.

FIG. 4 is a schematic structural diagram of a liquid crystal phased array antenna according to an embodiment of the present disclosure. As shown in FIG. 4, the liquid crystal phased array antenna includes a plurality of liquid crystal antenna units 100 arranged in an array, where the liquid crystal antenna units 100 adopt the liquid crystal antenna unit provided in the foregoing embodiments. For specific description of the liquid crystal antenna units 100, reference may be made to the description of the liquid crystal antenna units in the foregoing embodiments, and details are not repeated here.

In an embodiment the present disclosure, as shown in FIG. 4, the first substrates 3 of the plurality of liquid crystal antenna units 100 belong to the same substrate, the second substrates 5 of the plurality of liquid crystal antenna units 100 belong to the same substrate, the third substrates 6 of the plurality of liquid crystal antenna units 100 belong to the same substrate, and the transmission lines 7 of the plurality of liquid crystal antenna units 100 belong to the same transmission line. In some embodiments, the plurality of liquid crystal antenna units 100 may form a liquid crystal phased array antenna in combination.

In an embodiment of the present disclosure, the antenna units 1 are provided corresponding to the antenna control units 2 one by one in each of the liquid crystal antenna units 100.

In an embodiment of the present disclosure, the number of the antenna units 1 may be determined according to actual situations. In some embodiments, several hundreds to several tens of thousands of antenna units 1 may be provided and regularly arranged (arrayed) on the third substrate 6.

Using the principle of electromagnetic wave coherence, the liquid crystal phased array antenna provided in the embodiments of the present disclosure can change a phase of an electromagnetic wave signal by controlling a phase of current fed to the antenna unit 1 of each liquid crystal antenna unit 100, thereby altering a direction of the beam and realizing beam scanning.

Figure 5:
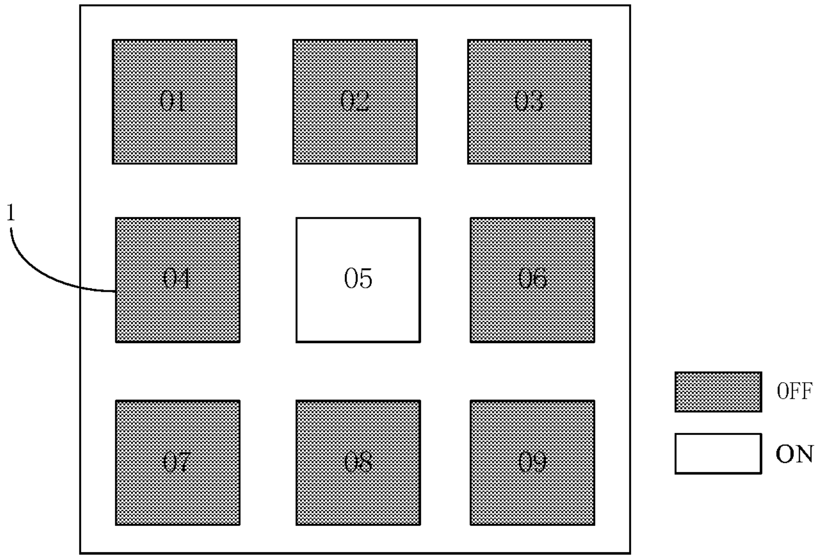
FIG. 5 is a top view of the liquid crystal phased array antenna of FIG. 4.
Figure 6:
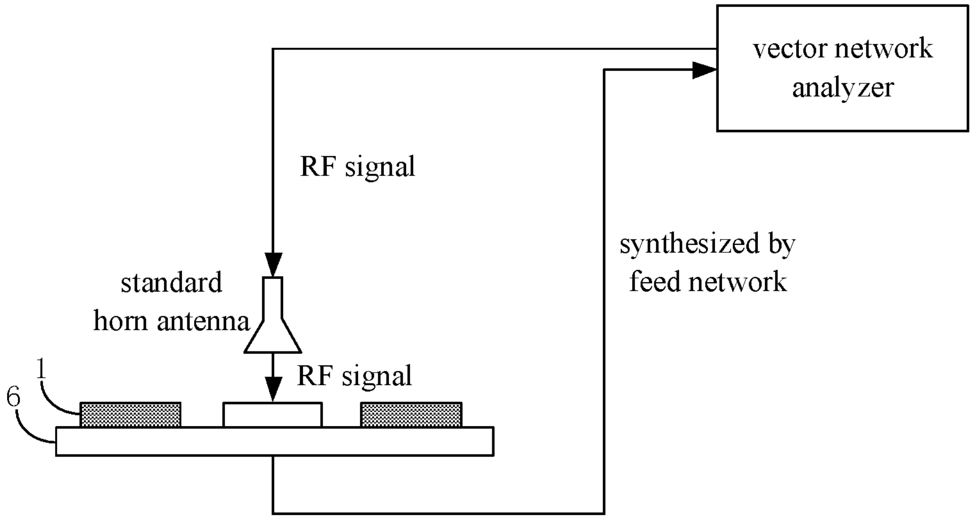
FIG. 6 is a schematic diagram showing phase calibration of a liquid crystal phased array antenna according to an embodiment of the disclosure.

FIG. 5 is a top view of the liquid crystal phased array antenna of FIG. 4, and FIG. 6 is a schematic diagram showing phase calibration of a liquid crystal phased array antenna according to an embodiment of the disclosure. In an embodiment of the present disclosure, a phase calibration test on the liquid crystal phased array antenna provided in the embodiments of the present disclosure is carried out with a vector network analyzer. As shown in FIGS. 4 and 5, when a phase calibration test needs to be performed on a certain antenna unit 1, such as the antenna unit 1 No. 05 in FIG. 5, first, the antenna unit 1 No. 05 needs to be controlled to be ON by the corresponding antenna control unit 2 thereof (i.e., the RF signal transmission channel of the antenna unit 1 is controlled to be opened), while the rest antenna units 1 are all OFF.

As shown in FIGS. 5 and 6, during the test, first, an RF signal is transmitted to a standard horn antenna via a transmitting port of the vector network analyzer. During the phase calibration process for a certain antenna unit 1 (e.g., the antenna unit No. 05), the RF signal is transmitted to the antenna unit 1 to be tested (e.g., the antenna unit No. 05) via the standard horn antenna through space transmission, and is returned to a receiving port of the vector network analyzer after power synthesis is performed by a feed network of the liquid crystal phased array antenna. In this method, a receiving phase of the antenna unit 1 to be tested (e.g., the antenna unit 1 No. 05) can be tested and obtained.

Compared with phase calibration of the liquid crystal phased array antenna in the related art, in the liquid crystal phased array antenna provided in the embodiments of the present disclosure, only the channel for receiving RF signals of the antenna unit to be tested is opened, while the channels for receiving RF signals of all the rest antenna units are closed, so that the influence on the tested phase of the antenna unit to be tested due to the coupling effect in a spatial electromagnetic field of adjacent antenna units of the antenna unit to be tested can be effectively avoided, and calibration measurement of the initial phase of the antenna unit to be tested is accurately realized, which significantly reduces calibration errors, greatly improves accuracy of the phase calibration test for the liquid crystal phased array antenna, radiation performance of the liquid crystal phased array antenna, and thus efficiency of the phase calibration test for the liquid crystal phased array antenna, and shortens the phase calibration test process for the liquid crystal phased array antenna, thereby substantially simplifying the volume production test for the liquid crystal phased array antenna, and reducing the test cost before products leave the factory.

Figure 7:
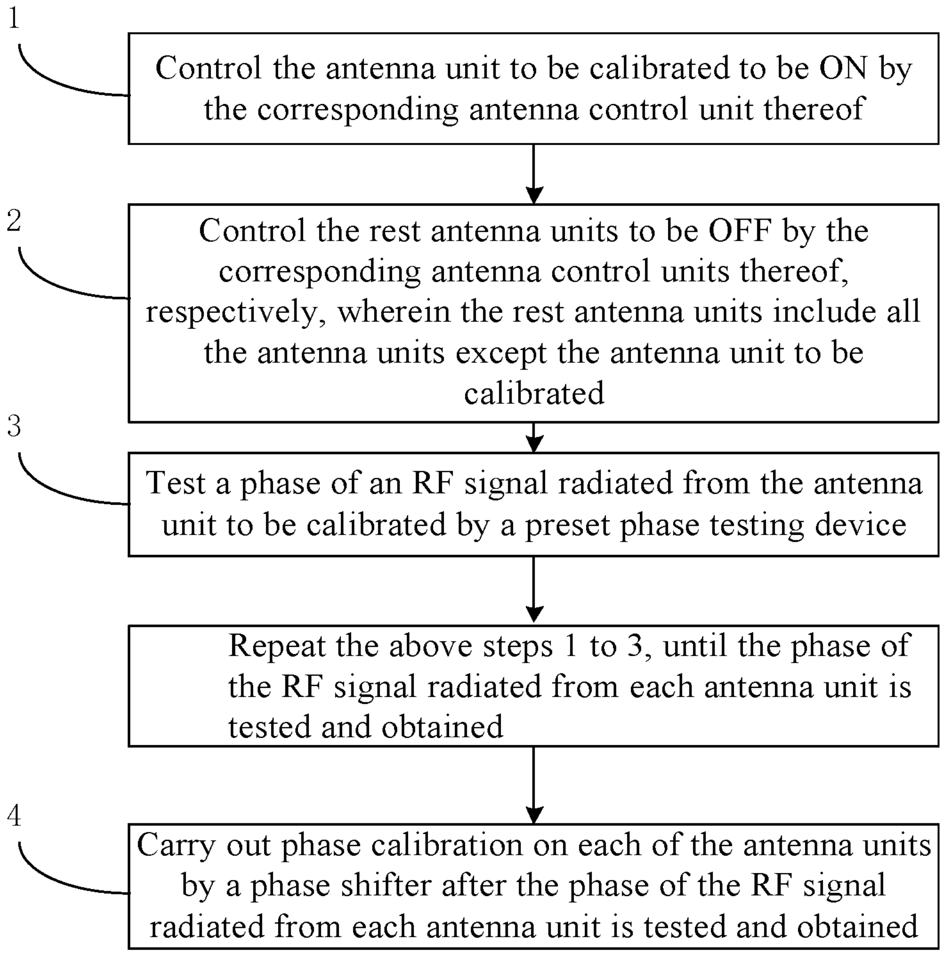
FIG. 7 is a flowchart of a phase calibration method for a liquid crystal phased array antenna according to an embodiment of the present disclosure.

FIG. 7 is a flowchart of a phase calibration method for a liquid crystal phased array antenna according to an embodiment of the present disclosure. As shown in FIG. 7, the liquid crystal phased array antenna adopts the liquid crystal phased array antenna provided in any one of the embodiments described above, and the phase calibration method includes:

sequentially taking each of the antenna units in the liquid crystal phased array antenna as an antenna unit to be calibrated, and executing the following steps:

controlling the antenna unit to be calibrated to be ON by the corresponding antenna control unit thereof.

For example, as shown in FIG. 5, when the antenna unit No. 05 is taken as the antenna unit to be calibrated, in step 1, the antenna unit No. 05 is controlled to be ON by the corresponding antenna control unit thereof, so as to open the channel for receiving/radiating RF signals of the antenna unit No. 05.

The rest antenna units are controlled to be OFF by the corresponding antenna control units thereof, respectively, wherein the rest antenna units include all the antenna units except the antenna unit to be calibrated.

For example, as shown in FIG. 5, when the antenna unit No. 05 is taken as the antenna unit to be calibrated, after the antenna unit No. 05 is turned ON in step 1, in step 2, all the rest antenna units except the antenna unit No. 05 (antenna units No. 01-04 and antenna units No. 06-09) are turned OFF by the corresponding antenna control units thereof so that all the rest antenna units except the antenna unit No. 05 are OFF.

A phase of an RF signal radiated from the antenna unit to be calibrated is tested by a preset phase testing device.

For example, as shown in FIG. 6, in an embodiment of the present disclosure, the phase testing device is a vector network analyzer. As shown in FIGS. 5 and 6, during the test, first, an RF signal is transmitted to a standard horn antenna via a transmitting port of the vector network analyzer. Then, the RF signal is transmitted to the antenna unit to be calibrated (e.g., the antenna unit No. 05) via the standard horn antenna through space transmission, and is returned to a receiving port of the vector network analyzer after power synthesis is performed by a feed network of the liquid crystal phased array antenna. In this method, a phase of the RF signal radiated from the antenna unit to be calibrated (e.g., the antenna unit 1 No. 05) can be tested and obtained.

The above steps 1 to 3 are repeated until the phase of the RF signal radiated from each antenna unit is tested and obtained, and then the following steps are executed:

carrying out phase calibration on each of the antenna units by a phase shifter, wherein the phase shifter includes the first substrate, the liquid crystal layer and the second substrate.

In an embodiment of the present disclosure, the phase shifter is a liquid crystal phase shifter including a first substrate, a liquid crystal layer, and a second substrate. In step 4, phase calibration is carried out on each of the antenna units by a phase shifter so that the RF signals radiated from each of the antenna units have the same phase.

In addition, the phase calibration method for the liquid crystal phased array antenna provided in the embodiments of the present disclosure is used to implement phase calibration for the liquid crystal phased array antenna provided in the foregoing embodiments, and for specific description of the liquid crystal phased array antenna, reference may be made to the description of the liquid crystal phased array antenna in the foregoing embodiments, and details are not repeated here.

It will be appreciated that the above implementations are merely exemplary implementations for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A liquid crystal antenna unit, comprising:
- a first substrate;
- a second substrate disposed opposite to the first substrate;
- a liquid crystal layer disposed between the first substrate and the second substrate;
- an antenna unit disposed on a side of the first substrate facing away from the liquid crystal layer; and
- an antenna control unit disposed corresponding to the antenna unit and configured to control ON/OFF of the antenna unit,
- wherein the liquid crystal antenna unit further comprises a third substrate; wherein
- the third substrate is disposed on the side of the first substrate facing away from the liquid crystal layer; and
- the antenna unit is disposed on the third substrate.

2. The liquid crystal antenna unit according to claim 1, wherein the antenna unit is disposed on a side of the third substrate facing away from the liquid crystal layer, and the antenna control unit is disposed on a side of the third substrate facing toward the liquid crystal layer.

3. The liquid crystal antenna unit according to claim 1, wherein the antenna unit is disposed on a side of the third substrate facing toward the liquid crystal layer, and the antenna control unit is disposed on a side of the third substrate facing away from the liquid crystal layer.

4. The liquid crystal antenna unit according to claim 1, wherein the antenna unit and the antenna control unit are both disposed on a side of the third substrate facing away from the liquid crystal layer; or
- the antenna unit and the antenna control unit are both disposed on a side of the third substrate facing toward the liquid crystal layer.

5. The liquid crystal antenna unit according to claim 4, wherein the first substrate, the second substrate, and the third substrate are each made of glass.

6. The liquid crystal antenna unit according to claim 5, wherein the antenna control unit comprises an RF switch.

7. The liquid crystal antenna unit according to claim 6, wherein the RF switch is an RF MEMS switch comprising: a vibration film layer, two insulation layers at two ends of the vibration film layer, and two RF signal transmission lines disposed corresponding to the two insulation layers one by one and positioned in the same plane, wherein each of the insulation layers is clamped between the vibration film layer and one of the RF signal transmission lines, and
- when a control voltage is applied to the RF MEMS switch, the vibration film layer of the RF MEMS switch is deformed to a position between the two RF signal transmission lines so that the RF MEMS switch is turned on.

8. The liquid crystal antenna unit according to claim 4, further comprising a transmission line located between the first substrate and the liquid crystal layer or between the second substrate and the liquid crystal layer.

9. A liquid crystal phased array antenna, comprising a plurality of liquid crystal antenna units according to claim 1 arranged in an array.

10. The liquid crystal phased array antenna according to claim 9, wherein the first substrates of the plurality of liquid crystal antenna units belong to the same substrate, and the second substrates of the plurality of liquid crystal antenna units belong to the same substrate.

11. The liquid crystal phased array antenna according to claim 9, wherein the liquid crystal antenna unit further comprises a third substrate; wherein
- the third substrate is disposed on the side of the first substrate facing away from the liquid crystal layer; and
- the antenna unit is disposed on the third substrate; and
- the third substrates of the plurality of liquid crystal antenna units belong to the same substrate.

12. The liquid crystal phased array antenna according to claim 9, wherein the RF switch is an RF MEMS switch comprising: a vibration film layer, two insulation layers at two ends of the vibration film layer, and two RF signal transmission lines disposed corresponding to the two insulation layers one by one and positioned in the same plane, wherein each of the insulation layers is clamped between the vibration film layer and one of the RF signal transmission lines, and
- ion lines so that the RF MEMS switch is turned on; and
- the transmission lines of the plurality of liquid crystal antenna units belong to the same transmission line.

13. A phase calibration method of a liquid crystal phased array antenna, the liquid crystal phased array antenna being the liquid crystal phased array antenna according to claim 9, and the phase calibration method comprising:
- sequentially taking each of the antenna units in the liquid crystal phased array antenna as an antenna unit to be calibrated, and executing the following steps:
- controlling the antenna unit to be calibrated to be ON by the corresponding antenna control unit thereof;
- controlling the rest antenna units to be OFF by the corresponding antenna control units thereof, respectively, wherein the rest antenna units comprise all the antenna units except the antenna unit to be calibrated;
- testing a phase of an RF signal radiated from the antenna unit to be calibrated by a phase testing device; and
- executing the following steps after the phase of the RF signal radiated from each of the antenna units is tested:
- carrying out phase calibration on each of the antenna units by a phase shifter, wherein the phase shifter comprises the first substrate, the liquid crystal layer and the second substrate.

* * * * *